P. A. STOVER.
AUTOMOBILE SIGNAL.
APPLICATION FILED OCT. 27, 1919.
1,346,567.
Patented July 13, 1920.
2 SHEETS—SHEET 1.
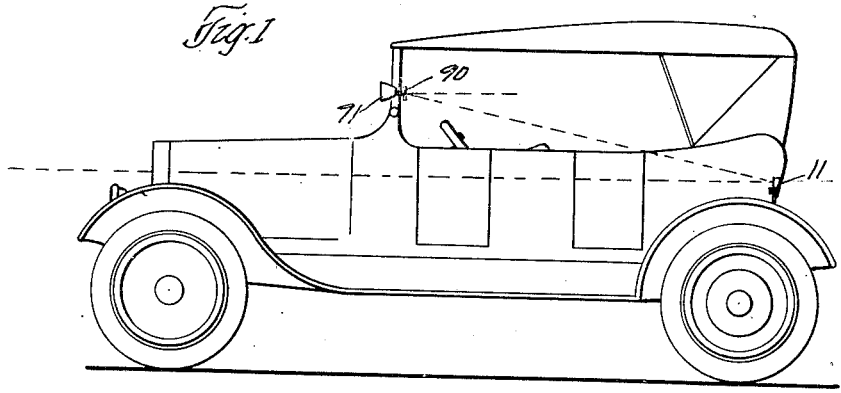
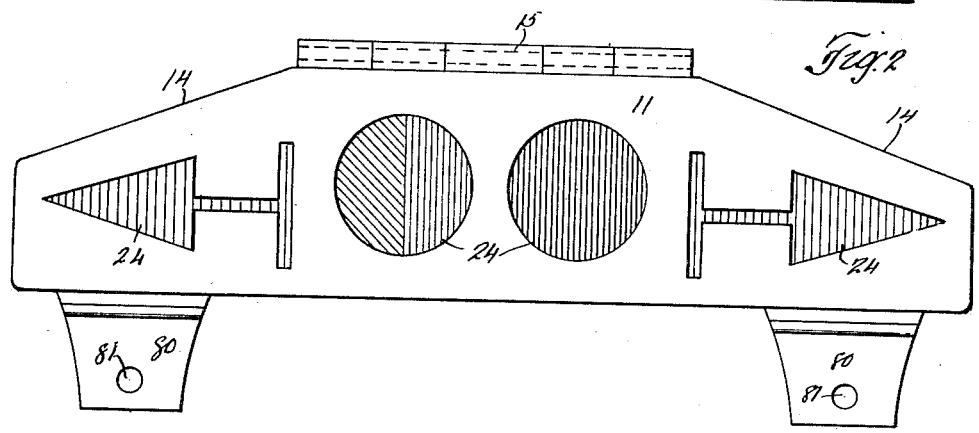
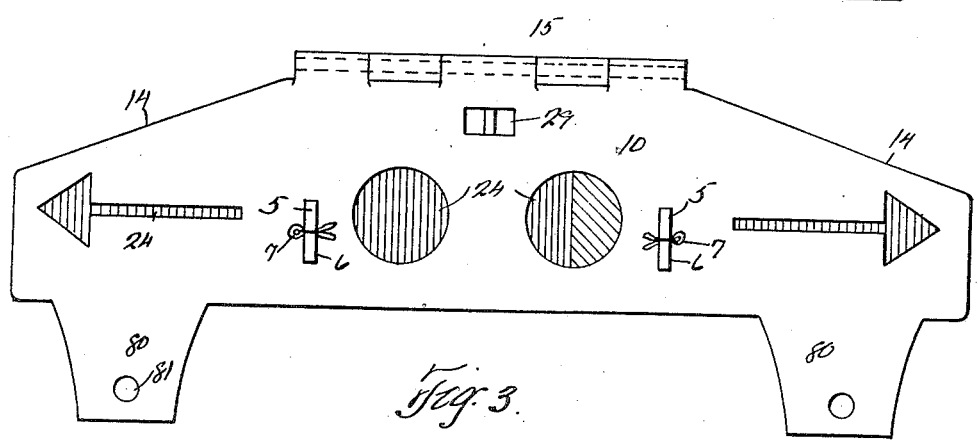
Inventor
Paul A. Stover,
By Baker Macklin,
Attys.

P. A. STOVER.
AUTOMOBILE SIGNAL.
APPLICATION FILED OCT. 27, 1919.
1,346,567.
Patented July 13, 1920.
2 SHEETS—SHEET 2.
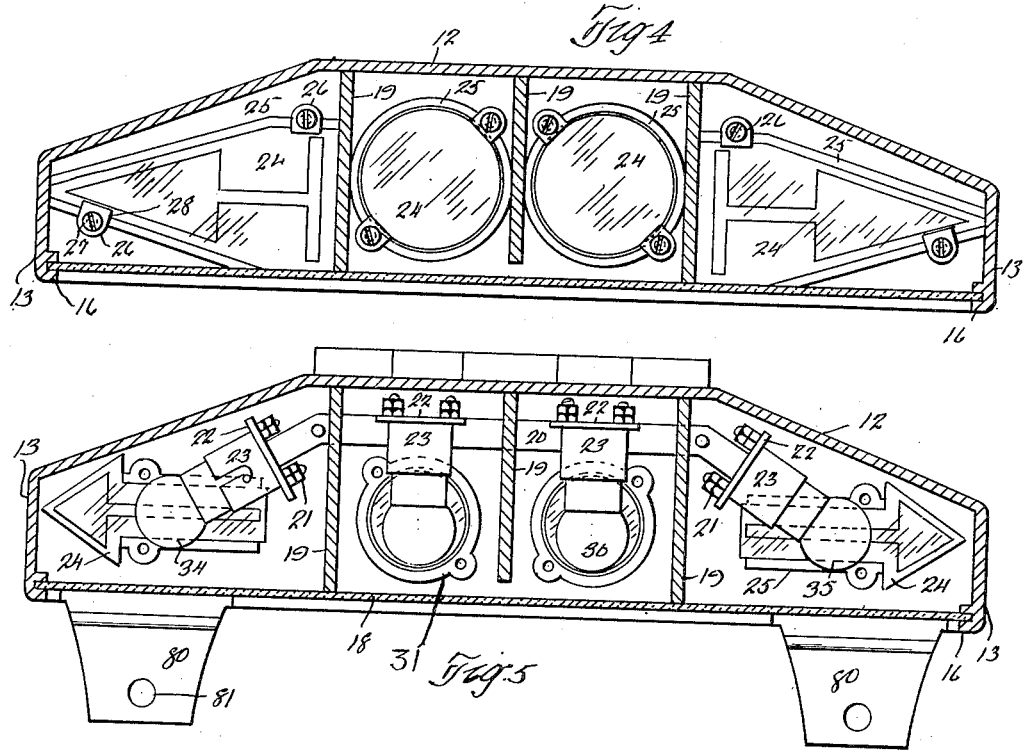
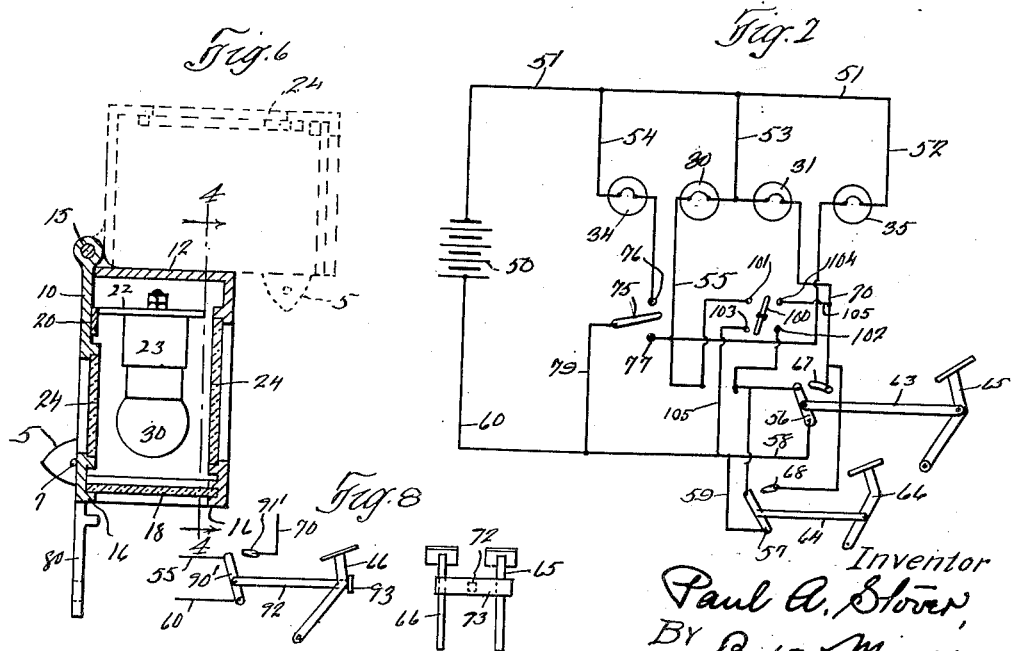
Inventor
Paul A. Stover,
BY Bates & Macklin,
Attys.

UNITED STATES PATENT OFFICE.

PAUL A. STOVER, OF CLEVELAND, OHIO.

AUTOMOBILE-SIGNAL.

1,346,567.   Specification of Letters Patent.   Patented July 13, 1920.

Application filed October 27, 1919. Serial No. 333,522.

*To all whom it may concern:*

Be it known that I, PAUL A. STOVER, residing at Cleveland, in the county of Cuyahoga and State of Ohio, have invented a certain new and useful Improvement in Automobile-Signals, of which the following is a full, clear, and exact description, reference being had to the accompanying drawings.

This invention relates to vehicle signal devices of the visual type, and the essential object of the invention is the provision of a simple, efficient device, pleasing in design and convenient in use, and which is adapted to be attached to an automobile or other vehicle for indicating the character of motion of the vehicle.

More specifically it is an object of this invention to so arrange an indicating means that it may be illuminated and adapted to show one color when running normally ahead and to show another color when the vehicle is slowing down or about to stop, and show by either of two additional lights the direction in which the vehicle is to turn.

Another object is the arrangement of the speed changing signals to be automatically operated upon movement of either the clutch lever, brake lever of the machine, or both, and the arrangement of the turning signals for operation by a manually controlled switch attached or adjacent to the steering wheel of the machine.

A further object is the arrangement of the device to display the signals toward the front as well as toward the rear, whereby the driver of the car, or someone in front of it, for example, a traffic policeman, or the driver of a machine approaching in the opposite direction, may note the signal as well as those in the rear.

Another object is the arrangement of the device in combination with a mirror to enable the driver of the car to ascertain easily the condition of the lights without turning his head.

Features of my invention are its simplicity, artistic appearance, compactness, cheapness of manufacture, convenience of attachment to existing automobiles, and convenience and economy in use.

My invention is hereafter more fully explained in connection with the accompanying drawings illustrating a preferred embodiment thereof, and the essential characteristics are summarized in the claims.

In the drawings, Figure 1 illustrates my device attached to the rear of an automobile; Fig. 2 is a rear elevation of the same on an enlarged scale; Fig. 3 is a front elevation of the same; Fig. 4 is a vertical section through the device on the line 4—4 of Fig. 6 looking in the direction of the arrows; Fig. 5 is a vertical section on the same line looking in the opposite direction and showing the lamps in position; Fig. 6 is a central vertical cross section; Fig. 7 is a wiring diagram illustrating the manner of controlling the illumination for the various indicators; and Fig. 8 illustrates a slightly modified arrangement of the mechanism for the automatically controlled signals.

In the embodiment of my invention illustrated in the drawings I have provided a long narrow box-like housing comprising a front wall 10, back wall 11, top wall 12 and end walls 13, which may be of any suitable material, such, for example, as sheet or cast metal. The back plate and top and end walls are rigidly secured or molded together at their edges and the forward edge of the top wall is provided with hinge members 15 co-acting with similar members on the top edge of the front plate 10. The front and back plates are preferably cut away and rounded at their upper corners, as illustrated at 14, and the top wall shaped accordingly, thereby providing a more artistic design for the housing.

The front and back plates and end walls of the housing are provided at their lower edges with inwardly extending flanges as shown at 16 for receiving a bottom plate 18 of glass or other translucent material. Rigidly secured to the rear plate 11 and top plate 12 are spaced partitions 19 dividing the housing into four compartments as clearly illustrated in Figs. 4 and 5. The middle partition is preferably made shorter than the other two and does not extend to the plate 18. The two outer partitions 19 are preferably provided with forwardly extending tongues 5 occupying slots 6 in the front wall 10 in registry therewith when the front wall 10 is swung on the hinges 15 to close the housing. Suitable means such as cotter pins 7 may be employed to retain the hinged parts in closed positions as illustrated in Fig. 3.

The front and rear walls are provided with registering openings for the display of signal lamps within the several compartments. Extending into all the compartments through slots in the partition walls 19, adjacent to the front wall 10 and secured thereto is preferably a sheet metal stamping 20 having portions 22 in each compartment bent at right angles therefrom and constituting brackets for the support of a signal lamp in each compartment. Suitable lamp sockets 23, those illustrated being of the bayonet type, are secured to the brackets 22 by screws 21 serving also as binding posts. The lamps 30, 31, 34 and 35 are preferably all small electric bulbs of a type which can be readily procured and can be easily mounted in the sockets 23 by swinging the rear portion of the housing upwardly on the hinges 15 as illustrated in dotted lines in Fig. 6. The front plate is provided with an opening at 29 to admit current carrying wires to the sockets 23.

The openings in the front and rear plates are closed by lenses or translucent plates 24, those in the end compartments and in one of the two center compartments being preferably red, and those in the other center compartment being green, or green and red, as shown in Fig. 2, where the law requires a constant red light. The plates 24 correspond in shape in general to the shape of the openings they close, those in the central compartments being preferably disks, and those in the end compartments being arrow shaped. The front and rear walls 10 and 11 have flanges 25 surrounding the openings and extending inwardly therefrom adapted to receive the plates 24 which may be secured therein by shellac or other adhesive. As an additional or substitute means for securing these plates in place, I provide bosses 26 at opposite points around the flanges having openings in which may be threaded screws 27 having washers 28 overlapping the plates 24 whereby they may be secured in position within the flanges 25.

It is desirable when the vehicle is to have its speed diminished, abruptly or otherwise, to light automatically the lamp 31 within the center compartment having red colored plates 24 closing the openings to show a red light, and at the same time extinguish the green light from the lamp 30 within the compartment having green colored plates 24, by automatically cutting off the current from the lamp 30 and sending it to the lamp 31 upon the first movement of the controlling lever, whether clutch or brake, actuated to reduce the speed.

When the vehicle is to be turned either to the right or to the left the current may be automatically directed through one of the lamps 34 or 35 in the end compartments of the housing by manually controlling circuits independent of the lamps 30 and 31. The lamps 34 and 35 give light through the arrow-shaped openings in the end compartments and the one corresponding to the direction in which the vehicle is to be turned will be illuminated by properly operating the controlling switch.

The operation of my device may be best understood by referring to the wiring diagram in Fig. 7, in which 50 indicates a battery, 51 a common wire leading current to each of the lamps having branches 52, 53 and 54; the branch 53 being connected with each of the lamps 30 and 31, while the branches 52 and 54 lead respectively to the lamps 35 and 34 in the end compartments. The lamp 30 illuminates the green, or combined green and red glass and its other terminal is connected by a wire 55 having branches leading to terminals normally connected through a switch 100 hereinafter described, with the switch arms 56 and 57, which switch arms are connected by wires 58 and 59 with a common wire 60 leading to the battery 50.

In normal running of the vehicle, current passes from the batteries 50 through the wire 51 and branch 53 to the lamp 30, thence through the wire 55, the switches 56 and 57 and wires 58, 59 and 60 back to the battery. The switches 56 and 57 may be connected by links 63 and 64 respectively with the clutch pedal 65 and brake lever 66. On the first forward movement of either or both of these controlling members, which will reduce the speed of the car, one or both of the switches 56 and 57 are brought out of contact with the terminals of the wire 55 onto arcuate contact plates 67 and 68, thus breaking the circuit through the lamp 30 and lighting the lamp 31, the current passing through the branch wire 53, the lamp 31, wire 70 leading to the contacts 67 and 68, thence through the switches 56 and 57 back to the battery, through the return wire 60. Thus in diminishing the speed of an automobile either by throwing out the driving clutch or putting on the brake, the first part of this movement will cause the green light to be extinguished and the red to become illuminated, thereby indicating that the vehicle is to go slower or stop.

To indicate the intended change of direction of the vehicle, the lamp in the corresponding end compartment is illuminated, thereby displaying an arrow indicating the turn to be made. I have shown a manually controlled switch at 75 operable at will between contacts 76 and 77 to cause the current to be led through either lamp 34 or lamp 35 according as the vehicle is to be turned to the left or to the right. When the switch 75 is in contact with the terminal 76, current is led from the battery 50 through the common wire 51 and branch 54 through the lamp 34 and switch closed at 76 to wire 79 and common return wire 60 back to the battery. When the switch 75 is in contact with the terminal 77 the current is led through the common wire 51 and the branch 52 through the lamp 35 in the compartment in the opposite end of the housing through the switch closed at contact 77 back to the battery through wires 79 and 60. This manually controlled switch may be of any suitable device, such, for example, as push buttons arranged on the steering column or attached to the steering wheel of the vehicle.

In Fig. 8 I have shown the wires 55 and 60 connected with the opposite terminals of a switch arm 90′ which may take the place of both switches 56 and 57, and be adapted to break the circuit through the green light 30 connected with wire 55 and make the circuit through the red light 31 at terminal 91′ corresponding to terminals 67 and 68 in Fig. 7. Pivoted to the switch arm 90′ is a T-lever having a shank 92 and a head 93 adapted to be engaged by either the clutch or brake levers 65 and 66, to change the character of light displayed when either or both of these levers is actuated to retard the progress of the car.

When the machine is stopped the clutch is normally in and the brake off; that is, the levers 65 and 66 are in the position illustrated in Figs. 7 and 8, with the circuit closed through the green, (or red and green) light 30. Inasmuch as the tail light of a standing car should be red only, I have provided the switch 100 shown in neutral position in Fig. 7. When the machine is running this switch 100 bridges the terminals 101 and 102 in the wire 55 from the green light 30 to the clutch and brake lever switches. When the machine is stopped the switch 100 is turned manually to break this circuit and bridge the terminals 103 and 104 in a wire 105 between the wire 70 from the red light and the return wire 60 to the battery, thereby shunting the open clutch and brake switches 56 and 57 or 90′.

As a convenient means for mounting the housing above the license number, I prefer to provide downwardly extending ears 80, rigid with the front plate 10, and adapted to be clamped between the number plate and its supporting bracket (not shown), by any suitable means which may pass through openings 81 in the ears 80. In Fig. 1, the device is shown as mounted above the license number plate on the rear left-hand fender of the automobile, the wiring not being shown in this figure. Either light 30 or 31, one of which will always be burning after the lights have been once turned on, will continually illuminate the license tag beneath, through the transparent bottom wall of the housing.

As will be understood, the various signal lights appearing through the rear plate 11 will indicate to any drivers in the rear the intentions of the driver or the progress of his car. The correspondingly arranged openings in the front plate 10 will indicate to the occupants of the car equipped with my invention, or others in front of the car, as, for example, a traffic policeman, or drivers approaching in the opposite direction, the same state of facts.

To enable the driver of the car more readily to observe the condition of the lights within the housing and see that they are functioning correctly, I prefer to provide a mirror adjacent to the driver, and to set the mirror at such an angle that the signal housing may be constantly in view of the driver. Such mirror is shown at 90 on the rear of the spot light.

It will be apparent from the foregoing description that I have provided a compact and simple signal device which is artistic in appearance, readily attached, and practical in use. When the car is running normally my device will always show a green light, or a combined red and green light, if a two-color lens is used, to comply with a law requiring a red tail light both while running and standing still. When the driver for any reason whatsoever checks his speed the green (or red and green) light will be instantly and automatically extinguished and a red light substituted. After the car is stopped the green (or red and green) light which is automatically restored, may be manually switched off and the red light displayed. Thus a colored signal light will always be displayed no matter what the condition of the car, unless manually turned off. The central bulbs, one of which only is illuminated at one time for signal purposes, will either of them serve constantly to afford white illumination of the license plate. My invention avoids the necessity of a separate tail light or light for the license plate, yet meeting the requirement of the law in these two respects as well as functioning as a signaling device to indicate changes in speed or in direction of movement of the car. As the driver may readily assure himself at all times of the exact condition of the lights, and as they are visible from both front and rear, my device is in fact a "safety first" automobile signal and is believed to be especially valuable from this standpoint.

It will be understood, of course, that the colors of light displayed and the shape of the openings in the housing may be varied to comply with the law of any locality, those illustrated being merely typical of general custom or law requirements.

I claim:

1. In an automobile visual signaling device, a housing divided into a plurality of horizontal lamp compartments, signal lamps within said compartments adapted to be selectively illuminated, openings within the front and rear walls of each compartment, lenses within said openings, those in one compartment being of a different color from those in another, whereby signal lights may be visible from both front and rear, for indicating changes in speed.

2. In a signaling device for indicating the progress of an automobile, the combination of a housing including two plates separably connected, having registering openings therein, lenses of different character covering said openings, electric lamps supported between said covered openings two of said lamps adapted to be illuminated to display signals indicating changes in speed.

3. In an automobile signal, a two-part housing having partitions dividing said housing into a plurality of horizontal lamp-receiving compartments, housing members having a tongue and slot connection whereby the two members may be retained in closed position, lamps within said compartments and means for selectively exhibiting lights of different colors from both front and rear of said housing to constitute signals for indicating the changes in speed and direction of an automobile.

4. In a signaling device for indicating the progress of an automobile, the combination of a housing comprising a box-like member having a plurality of horizontal compartments, and hinged to a second member at the top thereof, a lamp support extending through all the compartments adjacent to said front wall, a lamp secured to said support within each compartment, openings in the front and rear walls of said compartments, colored glasses covering said openings, and a translucent bottom for the housing, whereby said lamps constitute visual signals and illuminate a license plate beneath said housing.

5. In a signaling device for indicating the progress of an automobile, the combination of a housing comprising two parts, one of said parts consisting of a front plate having spaced openings therein, the other of said members comprising a rear plate, top and end walls and spaced partition members all rigidly secured together and hinged to said front plate, openings in said rear plate in registry with the openings in the front plate, said partitions dividing the housing into horizontal compartments, there being one pair of openings in each compartment, colored glasses covering said openings, electric lamps supported one in each compartment adapted to selectively illuminate the compartments and transmit signal lights therefrom, and a translucent member constituting a bottom wall for the housing whereby any of said lamps, when burning, illuminate a license plate supported below said housing.

6. In an automobile signal, a signal lamp housing mounted on the rear fender of the automobile, means for displaying light from said housing, and reflecting means adjacent to the driver whereby he can constantly apprise himself of the condition of the signal without turning his head.

7. In an automobile signaling device, a housing having a plurality of lamp compartments, signal lamps within said compartments, lenses in said housing whereby the signal light may be seen from either the front or rear of the automobile, one of said signal lights adapted to be active at all times, means for changing the color of said active light to indicate changes in speed of the automobile.

8. In an automobile signaling device a housing adapted to be mounted on the rear fender of an automobile, said housing being divided into a plurality of lamp compartments, lenses in front and rear portions of said housing whereby light may be seen either in front or rear of the automobile, one of said signal lights being a red lamp for indicating the slowing down or stopping position, and one of said signal lights being a green lamp for indicating the normal or running position.

9. In an automobile signaling device, a housing mounted on the rear fender of an automobile and divided into a plurality of horizontal lamp compartments, a bracket extending through the top of said compartments, signal lamps depending therefrom, lenses in the forward and rear portion of said housing whereby the signal light may be seen from the front and rear of the automobile, one of said signal lamps having a color adapted for indicating a slowing down or stopping position and one of said lamps having a different color for indicating the running or normal position, electrical connections operated by either the clutch or brake levers whereby either the red or green signal light is constantly illuminated.

In testimony whereof, I hereunto affix my signature.

PAUL A. STOVER.